「12」 United States Patent
Leibovich et al.

(10) Patent No.: US 8,478,884 B2
(45) Date of Patent: Jul. 2, 2013

(54) WIRELESS REMOTE DEVICE MANAGEMENT UTILIZING MESH TOPOLOGY

(75) Inventors: Izzy Leibovich, West Orange, NJ (US); Jayson Holovacs, Dunellen, NJ (US); John T. Burgess, Pittstown, NJ (US)

(73) Assignee: RIIP, Inc., Wilmington, DE (US)

( * ) Notice: Subject to any disclaimer, the term of this patent is extended or adjusted under 35 U.S.C. 154(b) by 425 days.

(21) Appl. No.: 11/241,845

(22) Filed: Sep. 30, 2005

(65) Prior Publication Data

US 2007/0079008 A1 Apr. 5, 2007

(51) Int. Cl.
*G06F 15/16* (2006.01)

(52) U.S. Cl.
USPC .......................................... 709/228; 709/219

(58) Field of Classification Search
USPC .................. 709/201–207, 217–231, 250
See application file for complete search history.

(56) References Cited

U.S. PATENT DOCUMENTS

| | | | |
|---|---|---|---|
| 4,698,672 A | 10/1987 | Chen et al. | |
| 4,771,865 A | 9/1988 | Hinderling | |
| 5,008,747 A | 4/1991 | Carr et al. | |
| 5,483,634 A | 1/1996 | Hasegawa | |
| 5,552,832 A | 9/1996 | Astle | |
| 5,576,845 A | 11/1996 | Komatsu | |
| 5,721,842 A | 2/1998 | Beasley et al. | |
| 5,732,212 A | 3/1998 | Perholtz et al. | |
| 5,742,274 A | 4/1998 | Henry et al. | |
| 5,757,424 A | 5/1998 | Frederick | |
| 5,767,897 A | 6/1998 | Howell | |
| 5,802,213 A | 9/1998 | Gardos | |
| 5,821,986 A | 10/1998 | Yuan et al. | |
| 5,861,960 A | 1/1999 | Suzuki et al. | |
| 5,884,096 A | 3/1999 | Beasley et al. | |
| 5,937,176 A | 8/1999 | Beasley et al. | |
| 6,016,166 A | 1/2000 | Huang et al. | |
| 6,091,857 A | 7/2000 | Shaw et al. | |
| 6,112,264 A | 8/2000 | Beasley et al. | |
| 6,167,432 A | 12/2000 | Jiang | |
| 6,173,082 B1 | 1/2001 | Ishida et al. | |
| 6,252,884 B1 * | 6/2001 | Hunter | 370/443 |
| 6,263,365 B1 | 7/2001 | Scherpbier | |
| 6,289,378 B1 | 9/2001 | Meyer et al. | |
| 6,304,895 B1 | 10/2001 | Schneider et al. | |
| 6,330,595 B1 | 12/2001 | Ullman et al. | |
| 6,333,750 B1 | 12/2001 | Odryna et al. | |
| 6,343,313 B1 | 1/2002 | Salesky et al. | |
| 6,345,323 B1 | 2/2002 | Beasley et al. | |
| 6,363,062 B1 | 3/2002 | Aaronson et al. | |
| 6,373,850 B1 | 4/2002 | Lecourtier et al. | |
| 6,378,014 B1 | 4/2002 | Shirley | |

(Continued)

OTHER PUBLICATIONS

The International Search Report and Written Opinion for PCT/US04/29899 dated Aug. 31, 2006.

(Continued)

*Primary Examiner* — Patrice Winder
*Assistant Examiner* — Julian Chang

(57) ABSTRACT

Disclosed is an end-to-end wireless solution for accessing, monitoring, and controlling remote devices, such as critical server systems, utilizing a mesh topology scheme via a short range, high throughput wireless connection. The present invention provides superior propagation in a multi-path environment as well as a low-power, non-intrusive solution to remotely access and control of a variety of devices. Further, the present invention enables portable management of the remote devices connected within the system.

20 Claims, 6 Drawing Sheets

U.S. PATENT DOCUMENTS

| | | | |
|---|---|---|---|
| 6,388,658 B1 | 5/2002 | Ahern et al. | |
| 6,389,464 B1 | 5/2002 | Krishnamurthy | |
| 6,408,334 B1 | 6/2002 | Bassman et al. | |
| 6,445,818 B1 | 9/2002 | Kim | |
| 6,532,218 B1 | 3/2003 | Shaffer et al. | |
| 6,535,983 B1* | 3/2003 | McCormack et al. | 713/310 |
| 6,539,418 B2 | 3/2003 | Schneider | |
| 6,564,380 B1 | 5/2003 | Murphy | |
| 6,567,813 B1 | 5/2003 | Zhu et al. | |
| 6,567,869 B2 | 5/2003 | Shirley | |
| 6,571,016 B1 | 5/2003 | Mehrotra et al. | |
| 6,621,413 B1 | 9/2003 | Roman | |
| 6,622,018 B1* | 9/2003 | Erekson | 455/420 |
| 6,664,969 B1 | 12/2003 | Emerson | |
| 6,675,174 B1 | 1/2004 | Bolle | |
| 6,681,250 B1 | 1/2004 | Thomas et al. | |
| 6,701,380 B2 | 3/2004 | Schneider | |
| 6,728,753 B1 | 4/2004 | Parasnis et al. | |
| 6,771,213 B2 | 8/2004 | Durst | |
| 6,772,169 B2 | 8/2004 | Kaplan | |
| 6,850,502 B1 | 2/2005 | Kagan et al. | |
| 6,952,495 B1 | 10/2005 | Lee | |
| 7,024,474 B2 | 4/2006 | Clubb | |
| 7,042,587 B2 | 5/2006 | Fiske | |
| 7,099,934 B1 | 8/2006 | Ewing et al. | |
| 7,117,266 B2 | 10/2006 | Fishman et al. | |
| 7,127,619 B2 | 10/2006 | Unger et al. | |
| 7,206,940 B2 | 4/2007 | Evans et al. | |
| 7,249,167 B1 | 7/2007 | Liaw | |
| 7,260,624 B2 | 8/2007 | Sivertsen | |
| 7,342,895 B2* | 3/2008 | Serpa et al. | 370/254 |
| 7,382,397 B2 | 6/2008 | Mottur | |
| 7,502,884 B1* | 3/2009 | Shah et al. | 710/316 |
| 7,576,770 B2 | 8/2009 | Metzger et al. | |
| 7,827,258 B1 | 11/2010 | Kalbarga | |
| 7,853,740 B2 | 12/2010 | Liew | |
| 8,176,226 B2 | 5/2012 | Hsueh | |
| 2002/0018124 A1* | 2/2002 | Mottur et al. | 348/211 |
| 2002/0038334 A1 | 3/2002 | Schneider | |
| 2002/0095594 A1 | 7/2002 | Dellmo | |
| 2002/0128041 A1 | 9/2002 | Parry | |
| 2002/0147840 A1 | 10/2002 | Mutton et al. | |
| 2002/0188709 A1 | 12/2002 | McGraw et al. | |
| 2003/0017826 A1 | 1/2003 | Fishman et al. | |
| 2003/0030660 A1 | 2/2003 | Dischert | |
| 2003/0037130 A1* | 2/2003 | Rollins | 709/223 |
| 2003/0088655 A1 | 5/2003 | Leigh | |
| 2003/0092437 A1 | 5/2003 | Nowlin | |
| 2003/0112467 A1 | 6/2003 | McCollum et al. | |
| 2003/0135656 A1 | 7/2003 | Schneider | |
| 2003/0191878 A1 | 10/2003 | Shirley | |
| 2003/0217123 A1 | 11/2003 | Anderson | |
| 2004/0015980 A1 | 1/2004 | Rowen | |
| 2004/0042547 A1 | 3/2004 | Coleman | |
| 2004/0045030 A1 | 3/2004 | Reynolds et al. | |
| 2004/0062305 A1* | 4/2004 | Dambrackas | 375/240.01 |
| 2004/0093401 A1 | 5/2004 | Buswell et al. | |
| 2004/0117426 A1 | 6/2004 | Rudkin | |
| 2004/0249953 A1* | 12/2004 | Fernandez et al. | 709/227 |
| 2005/0018766 A1 | 1/2005 | Iwamura | |
| 2005/0027890 A1 | 2/2005 | Nelson | |
| 2005/0030377 A1 | 2/2005 | Li | |
| 2005/0044184 A1 | 2/2005 | Thomas | |
| 2005/0094577 A1 | 5/2005 | Ashwood-Smith | |
| 2005/0104852 A1* | 5/2005 | Emerson et al. | 345/157 |
| 2005/0114894 A1 | 5/2005 | Hoerl | |
| 2005/0125519 A1 | 6/2005 | Yang | |
| 2005/0132403 A1 | 6/2005 | Lee | |
| 2005/0195775 A1 | 9/2005 | Petite | |
| 2005/0204026 A1 | 9/2005 | Hoerl | |
| 2005/0204082 A1 | 9/2005 | Thomas | |
| 2006/0083205 A1* | 4/2006 | Buddhikot et al. | 370/338 |
| 2006/0095539 A1* | 5/2006 | Renkis | 709/217 |

OTHER PUBLICATIONS

The International Search Report and Written Opinion for PCT/US05/40948 dated Jul. 20, 2006.

The International Search Report and Written Opinion for PCT/US05/07684 dated Sep. 25, 2007.

The International Search Report and Written Opinion for PCT/US06/12280 dated Mar. 14, 2007.

The International Search Report and Written Opinion for PCT/US05/25275 dated May 11, 2006.

Adder, Products Brochure, APX 304572-304579, Apr. 1, 1998, 8 pages.

AdderViewOSD, Products Brochure, RCI 173246-173279, Aug. 1, 2002.

Avocent's Pre-Markman Hearing Memorandum in Support of its Proposed Claim Constructions (Dec. 15, 2004).

Avocent Redmond's Answering Pre-Markman Hearing Briefing (Jan. 8, 2005).

Avocent Redmond's Supplemental Responses to Raritan's Second Set of Post-Remand Interrogatories (Nos. 15R-17R), Mar. 14, 2005.

Apex, OutLook User Guide, 1997.

Apex et al., Products Brochure, APX 082949-082971, 1996.

Apex PC Solutions, Users Guide, 1993.

Apex, Products Brochure, APX 018983-018996, Jan. 7, 1997.

Apex, Products Brochure, APX 019103-019121, 1995-1996.

Apex, Products Brochure, APX 056304-056346, Oct. 1, 1998.

Apex et al, Products Brochure, APX 316564-316621.

Apex et al, Products Brochure, APX 316848-316909.

Apex et al, Products Brochure, APX 316910-316969.

Apex's Sales Brochure, Sep. 1, 1998, 1 page.

Apex, SwitchBack User Guide, 1995.

Apex's Motion on the PolyCon Catalog and Supporting Memorandum, Jan. 15, 2002.

Apex's Proposed Markman Findings, Jan. 25, 2002.

Appendix1 to Apex's Proposed Markman Findings, Jan. 25, 2002.

Badman, Switching into High Gear, Network Computing, Apr. 30, 2001.

Belkin, The OmniView PRO User Manual, Jul. 16, 2001.

Bruce McNair Deposition Transcript, Case No. 01-CV-4435, May 5, 2005.

Compaq, White papers, 1996, APX 083313-APX 083326, APX 083335-APX 083389.

Ching-I Hsu Deposition Transcript, Case No. 01-CV-4435, Mar. 11, 2005.

Cybex, Director Installer/User Guide, Nov. 1996.

Cybex, 4 x P & 1 x P KVM Switches Guide to Applications, 1996.

Datavision, Product Brochure, 1992, 3 pages.

Declaration of Joseph C. McAlexander in Support of Apex's Motion for a Preliminary Injunction, Sep. 17, 2001.

Declaration of Joseph C. McAlexander, III in the Civil Action No. 01-CV-4435, Dec. 15, 2004.

Declaration of Sharad Malik, Ph. D., Jan. 8, 2002.

Declaration of Sharad Malik, Ph.D. (Jan. 18, 2005).

Defendant Raritan Computer Inc.'s Claim Construction Statement (Dec. 15, 2004).

Defendant Raritan Computer Inc.'s Motion for Partial Summary Judgment (Jan. 8, 2002).

Defendant Raritan Computer Inc.'s Proposed Findings of Fact and Conclusions of Law, Apr. 27, 2005.

Defendant Raritan Computer Inc.'s Reply to Avocent's Proposed Claim Constructions (Jan. 18, 2005).

Defendant Raritan Computer, Inc.'s Response to Plaintiffs Second Set of Interrogatories (Nos. 9-12), Oct. 30, 2001.

Defendant Raritan Computer, Inc.'s Second Set of Interrogatories to Plaintiff Apex, Nov. 16, 2001.

Defendant Raritan Computer, Inc.'s Supplemental Response to Plaintiffs Second Set of Interrogatories (Nos. 9-12), Dec. 12, 2001.

Dei, Central Control of Multiple PCs Without Massive Cabling, product brochure, Nov. 1992.

Expert Report by Joseph C. McAlexander Regarding Infringement and Validity of U.S. Patent Nos. 5,884,096, 5,937,176 and 6,112,264, Jan. 3, 2001.

Expert Report by Joseph C. McAlexander Regarding Infringement and Validity of U.S. Patent Nos. 5,884,096, 5,937,176 and 6,112,264, Jan. 3, 2001. Claim Charts.

Expert Report of Michael H. Davis, Jan. 13, 2002.

Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
File History of Reissue U.S. Patent No. 5,732,212, Apr. 11, 2002. Part 1.
File History of Reissue U.S. Patent No. 5,732,212, Apr. 11, 2002. Part 2.
File History of U.S. Appl. No. 10/032,325, Jun. 14, 2004.
Findings and Conclusions, *Apex* v. *Raritan*, Civil Action No. 01-CV-0035, Feb. 25, 2002.
Investor's Business Daily, Box Keeps Monitors, Mice to a Minimum, Sep. 8, 1997.
Joseph C. McAlexander Deposition Transcript, Case No. 01-CV-4435, Apr. 27, 2005.
KVM Switch History, Aug. 2, 2002, 2 pages.
KVM Switches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
Marksman Transcript, *Avocent* v. *Raritan*, Civil Action No. 4435, Feb. 3, 2005.
Marksman Transcript, *Avocent* v. *Raritan*, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6, 1992.
Ocean Isle, Reachout Product Brochure, RCI 172996-173006, Jun. 1994.
PC World, New Products, May 1995, 2 pages.
PolyCon GmbH Data System Inc., product catalogs, APX 024328-042697, prior to Spring, 1995.
Press Release, Maintain Error-Free Central Control of 128 PCs from One Set of Keyboard, Mouse, and Monitor, Feb. 4, 1999, 1 page.
Protest Under 37 CFR 1.291 Filed in U.S. Appl. No. 08/969,723, Feb. 13, 1999.
Raritan, CompuSwitch, Mar. 16, 1998, 1 page.
Raritan, Dominion KSX, Jul. 19, 2003, RCI 139356-139371.
Raritan, Dominion KX and Dominion KSX, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.
Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infirngement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pages.
Tikkler, Belkin OmniView SE 4-Port KVM Switch, Nov. 8, 2000.

Tony Dekerf and Gary D. Davis, "A Close Look At Modern Keyboard, Video & Mouse Switches," 1995.
Trial Transcript, *Apex* v. *Raritan*, Southern District of New York, Case No. 01-CV-4435, vol. 1, Jan. 2002.
Trial Transcript, *Apex* v. *Raritan*, Southern District of New York, Case No. 01-CV-4435, vol. 2, Jan. 2002.
Trial Transcript, *Apex* v. *Raritan*, Southern District of New York, Case No. 01-CV-4435, vol. 3, Jan. 2002.
Trial Transcript, *Apex* v. *Raritan*, Southern District of New York, Case No. 01-CV-4435, vol. 4, Jan. 2002.
Trial Transcript, *Apex* v. *Raritan*, Southern District of New York, Case No. 01-CV-4435, vol. 5, Jan. 2002.
Trial Transcript, *Apex* v. *Raritan*, Southern District of New York, Case No. 01-CV-4435, vol. 6, Jan. 2002.
*Trial Transcript, Apex* v. *Raritan*, Southern District of New York, Case No. 01-CV-4435, vol. 7, Jan. 2002.
Tron International, Inc., KVM Products Catalogs, 1997.
Tron International, Inc., Products Catalogs, 1996.
Tron International, Inc., Product Brochure, 1997, 4 pages.
Unisys, PW2 Advantage Series Rackmount Server, 1995.
Yee Liaw Deposition Transcript, Case No. 01-CV-4435, Mar. 3, 2005.
Yee-Shung Liaw Deposition Transcript, Case No. 01-CV-4435, Dec. 6, 2001.
The list of docket reports in the litigation: *Avocent Redmond Corp.* v. *Raritan Computer, Inc.*, Civil Action No. 1:01-CV-04435(PKC), United States District Court for the Southern District of New York.
The Office Action issued in U.S. Appl. No. 10/666,940, on Sep. 8, 2008.
The Office Action issued in U.S. Appl. No, 10/898,001, on Sep. 5, 2008.
The Office Action issued in U.S. Appl. No. 10/988,184, on Aug. 21, 2008.
The Office Action issued in U.S. Appl. No. 10/799,349, on Sep. 8, 2008.
The Office Action issued in U.S. Appl No. 11/102,450, on Oct. 3, 2008.
Defendant Raritan Computer, Inc.'s Response to Plaintiff's First Set of Interrogatories, Aug. 31, 2001.
The extended European Search Report mailed on Oct. 27, 2010 in the related European Application No. 05820759.8.
The Office Actions issued in the related U.S. Appl. No. 10/666,940 on May 24, 2006, Feb. 6, 2007 and Jun. 20, 2007.
The Office Actions issued in the related U.S. Appl. No. 10/666,940 on Feb. 22, 2008, Nov. 21, 2008 and May 11, 2009.
The Office Actions issued in the related U.S. Appl. No. 10/666,940 on Jan. 22, 2010, Nov. 15, 2010 and Apr. 4, 2011.
The Office Actions issued in the related U.S. Appl. No. 10/898,001 on Jun. 3, 2009.
The Office Actions issued in the related U.S. Appl. No. 10/988,184 on Sep. 14, 2007, Apr. 9, 2008 and Jun. 27, 2008.
The Office Actions issued in the related U.S. Appl. No. 10/988,184 on Feb. 19, 2009, Sep. 23, 2009 and Jun. 14, 2010.
The Office Actions issued in the related U.S. Appl. No. 10/233,299 on Aug. 4, 2005, Jan. 11, 2006, Jul. 24, 2006 and Jan. 4, 2007.
The Office Actions issued in the related U.S. Appl. No. 10/233,299 on Jan. 31, 2007, May 21, 2007, Jul. 13, 2007 and Jul. 19, 2007.
The Office Actions issued in the related U.S. Appl. No. 10/233,299 on Jul. 24, 2007, Oct. 29, 2007, Dec. 3, 2007 and Feb. 13, 2008.
The Office Actions issued in the related U.S. Appl. No. 10/233,299 on May 23, 2008, Jan. 23, 2009 and Oct. 21, 2009.
The Office Actions issued in the related U.S. Appl. No. 10/799,349 on Jun. 13, 2007, Feb. 3, 2010 and Aug. 19, 2010.
The Office Actions issued in the related U.S. Appl. No. 11/102,450 on Dec. 18, 2009 and Aug. 9, 2010.
Artimi Ltd., "UWB & Mesh Networks White Paper," Aug. 2003.
The extended European Search Report by the European Patent Office, mailed on May 3, 2012, in the related European Application No. EP 06816094.4.
The extended European Search Report by the European Patent Office, mailed on Apr. 17, 2012, in the related European Application No. EP 06740384.0.

The extended European Search Report by the European Patent Office, mailed on Apr. 18, 2012, in the related European Application No. EP 05730955.1.

The extended European Search Report by the European Patent Office, mailed on Feb. 20, 2012, in the related European Application No. EP 05772143.3.

The extended European Search Report by the European Patent Office, mailed on Jan. 24, 2012, in the related European Application No. EP 04783929.5.

The Notice of Allowance, mailed on Jul. 25 & Sep. 1, 2011, in related U.S. Appl. No. 10/666,940, now U.S. Pat. No. 8,068,546.

Balaouras et al., "Potential and Limitations of a Teleteaching Environment based on H.323 Audio—Visual Communication Systems," Computer Networks, vol. 34, Issue 6, Dec. 2000, pp. 945-958.

The Office Action, mailed on Sep. 13, 2011, in related U.S. Appl. No. 12/881,255.

The Office Actions, mailed on Mar. 23, 2011, Feb. 1, 2012 and May 16, 2012, in related U.S. Appl. No. 12/947,743.

Sachin et al., "A Real-Time Interactive Virtual Classroom. Multimedia Distance Learning System," IEEE Transactions on multimedia, vol. 3, No. 4, Dec. 2001.

The Communication from the Examining Division by the European Patent Office, mailed on May 10, 2012, in the related European Application No. EP 04783929.5.

The Notice of Allowance, mailed on May 31, 2012, in related U.S. Appl. No. 12/881,255.

US Office Action, mailed on Sep. 25, 2012, in the related U.S. Appl. No. 12/947,743.

\* cited by examiner

WIRELESS REMOTE DEVICE MANAGEMENT UTILIZING MESH TOPOLOGY

FIELD OF THE INVENTION

The present invention relates generally to the field of wireless remote device management. In particular, the present invention relates to a solution for accessing remote devices, such as critical server systems, utilizing a mesh topology scheme via a high throughput wireless connection. Further, the present invention provides; superior propagation in a multi-path environment as well as a low-power, non-intrusive solution to remotely access and control of a variety of devices.

BACKGROUND OF THE INVENTION

In a typical computer environment, a Local Area Network ("LAN") allows for one or more servers to be connected to several computers such that the resources of each server are available to each of the connected computers. The LAN is typically comprised of networking equipment such as routers, hubs, switches, etc. In this networked environment, a dedicated keyboard, video monitor and mouse may be employed for each computer and server.

Maintaining proper operation of the LAN requires the system administrator to monitor and maintain the individual networking equipment, servers, and computers. This maintenance frequently requires the system administrator to perform numerous tasks from a user console connected to the networking equipment, server, or computer. For example, to reboot a computer or server or to add or delete files, the system administrator is often required to operate the computer or server from its local user console, which may be located at a substantial distance from the system administrator's computer and from other computers or servers connected to the LAN. Therefore, to accomplish the task of system administration, the system administrator must often physically relocate to access the local user consoles of remotely located computers and servers.

As an alternative, dedicated cables may be installed from each remotely located computer and server to the system administrator's user console to allow the system administrator to fully access and operate the remote computer equipment. However, this alternative requires substantial wiring and wire harnessing, both of which may require tremendous cost. Additionally, as the distance between the system administrator's user console and the remote computer equipment increases, a decrease in the quality of the transmitted signal often results. Thus, dedicated cables between the system administrator's user console and remote computer equipment may not be a feasible alternative.

In some situations, it is desirable to manage the networking equipment, servers, and computers remotely located from the system administrator. For example, a software program such as pcAnywhere may be utilized to access a remote computer over the Internet or a LAN utilizing the keyboard, video monitor, and cursor control device (e.g., a mouse) attached to a local user workstation. Remote computer access programs, such as pcAnywhere, typically require that host software is installed on the remote computer and client software is installed on the local user workstation. To access a remote computer, a user at the user workstation selects the desired remote computer from a list and enters the appropriate username and password. Once access has been granted to the remote computer, the user utilizes the keyboard, video monitor, and cursor control device attached to the local user workstation to access and operate the remote computer.

Hardware solutions also exist for operating a remote computer from a user workstation over a LAN or through a dedicated network. In contrast to the software solutions, the hardware solutions do not typically require host and/or client software. Instead, the hardware solutions typically utilize a keyboard, video monitor, and mouse ("KVM") switch, which is accessible over a LAN via a conventional network infrastructure, such as Transfer Control Protocol/Internet Protocol ("TCP/IP"). Such systems are often referred to in the art as Keyboard, Video, and Mouse over Internet Protocol ("KVMoIP") systems.

Generally, a user or system administrator accesses the remote computers attached to the KVM switch utilizing an Internet browser or client software associated with the KVM switch. Once the remote computer has been selected, the remote computer's video signal is routed to the user workstation's video monitor and a user may then utilize a keyboard and/or mouse to control the remote computer. The KVM switch may additionally include a connection to the power source of the remote computer for a hard reboot in case of system failure. The aforementioned hardware and software solutions generally utilize a compression algorithm to reduce the necessary bandwidth required to transmit the video signals.

KVMoIP devices offer several advantages over traditional KVM switches. In traditional KVM switches, one generally has to run cables from each server to switch chassis, then run more dedicated cables from switch-to-switch, and run still more cables from switches to each end-user console. The cabling is not only costly, but also laborious and requires both effort and knowledge in larger systems. Additionally, space becomes a consideration as these systems generally take up a large amount of room. KVMoIP systems offer a simplified solution to this cabling problem. The KVMoIP equipment can be anywhere the computers are located, with short cables from the KVMoIP unit to the local computers. Only one CAT5 or equivalent need be run from the KVMoIP unit to an Ethernet hub. This connection can also be done wirelessly, eliminating the need for the CAT5 cable.

Additionally, KVMoIP systems make it easier to add more computers to the existing network. When computers need to be added, they do not have to be located in the same room or even the same building as in analog based KVM equipment. The only requirement is to plug in the KVMoIP unit into an accessible network. This design eliminates the need for more switch-to-switch wire runs, or other cable extenders.

KVMoIP devices generally connect directly to an IP network via a Network Interface Card ("NIC"). Users accessing the KVMoIP device can select one or more of the switch inputs at any time and a number of independent user sessions are supported. Conversely, in traditional KVM switches, only one switch computer can be displayed at any time.

KVMoIP software is also incorporated into the system. KVMoIP software features several methods of accessing a KVMoIP device. Local consoles, dial-up, and serial connections offer a backup. Often proprietary software is implemented within the KVMoIP device. Other systems known in the art access KVMoIP devices via standard web browsers, Virtual Network Computing ("VNC") clients, etc.

Recently, there has been a proliferation of wireless technologies to enable computers to communicate and share resources. For example, the Bluetooth and IEEE 802.11 standards are two rapidly developing technologies that allow computers to wirelessly communicate. Many devices are commercially available that are compatible with one or both of these standards. Bluetooth devices are generally utilized for shorter-range communication, utilizing lower transmission rates than 802.11 compliant devices. 802.11 standard devices enable wireless TCP/IP communications over distances of up to three hundred (300) feet. For example, Personal Computer Memory Card International Association ("PCMCIA") wireless cards enable laptops to communicate utilizing the TCP/IP protocol. Many newer laptops come standard with wireless communication access devices. Additionally, 802.11 compatible wireless local area networks ("WLANs") are now often utilized in lieu of, or in conjunction with, traditional LANs.

The 802.11 standard, ratified by the Institute of Electrical and Electronics Engineers ("IEEE") in 1997, is a wireless communications standard generally utilized for networking, file sharing and Internet connection sharing. In 1999, two extensions to the 802.11 standard were added, 802.11a and 802.11b. The 802.11a standard operates in a frequency range of 5 Gigahertz (GHz) at speeds of up to 54 Megabits per second (Mbps). The 802.11b standard (also known as WiFi), was designed to be more affordable, and operates in the 2.64 GHz range at speeds of up to 11 Mbps. With the proliferation of 802.11b devices, the 802.11g standard was recently ratified which allows for 802.11a speeds in 802.11b compatible frequencies.

All 802.11 standards allow for computers to communicate wirelessly without the need for hubs, routers, switches, etc. The 802.11 standard allows for the creation of WLANs, which use the same TCP/IP communication protocols as traditional wired LANs. With commercially available wireless communication devices, two computers can communicate from up to three hundred (300) feet away, although with repeaters, stronger antennae, signal boosters, etc., this range may be increased.

Systems that enable wireless access of a remote device are currently known in the art of computer management. For example, one such system comprises a single receiver and a single transmitter that, together, allow a user to access a remote computer using a keyboard, video monitor, and mouse. In this system, both the receiver and the transmitter are enabled for wireless communication. The receiver, coupled to the keyboard and mouse, receives keyboard and mouse data and wirelessly transmits this data to the transmitter. The transmitter is coupled to a remote computer and supplies the data to the keyboard and mouse ports of this remote computer. Simultaneously, the transmitter receives video data from the remote computer and transmits this data wirelessly to the receiver where it is displayed on the video monitor coupled to the receiver. Thus, this system enables extended length access of a single remote computer through a wireless connection.

Another known system consists of a switching device for controlling multiple remote computers where the switching device comprises a wireless transmitter and a wireless receiver. The switching device is configured to enable a user to select from among multiple computing devices and wirelessly link a peripheral device with a selected computing device for user interaction. In this system, the switching device initially develops a list of available computing devices. A user chooses from this list and the switching device establishes a wireless link with the corresponding computing device. Thus, this wireless switch only enables one connection between a user and a remote computer at any instance. Further, each of the computing devices must also have wireless communications capabilities to enable wireless communication with the switch.

A method for switching the utilization of a shared set of wireless input/output ("I/O") devices between multiple computers is also known. This method includes the utilization of a software-based switching mechanism where wireless protocols enable the sharing of wireless peripheral devices between multiple computers. A wireless data packet (a "token") is utilized to transfer control of the I/O devices utilizing a master/slave relationship for the transfer of control. The token, in the form of computer-to-computer wireless command, is utilized to transfer control of a wireless peripheral device from one device to another. Thus, in this known system, server-to-server communications are necessary for transferring the control of a wireless peripheral. Further, in this system only one computer can control a set of wireless peripherals at a time.

In another known system for accessing computer systems in a computer network, each computer system provides and receives operator interface data signals containing user output and input information. Central to this system is a wireless administrator device that allows a system operator to remotely control a plurality of computer systems interconnected through a communications network. The wireless administrator device includes a wireless communications module that operates in "transmit" and "receive" modes to communicate with the wireless communication modules coupled to the computer systems. The wireless administrator device includes an operator interface with a video display, mouse and keyboard to enable user interaction in a selection mode or a control mode. The interface includes a manual connect button that allows the administrator to display, on the video monitor, a list of available computer systems that may be accessed. Upon selection of a computer, the administrator remotely controls the computer through the operator interface.

Systems are also known that provide a wireless interface between a remote host computer and a personal digital assistant ("PDA"). In one such system, the PDA presents the user with a graphical user interface ("GUI") allowing for input by way of a passive stylus, which can be used in a pen mode or a mouse mode. The PDA also includes a transceiver that communicates wirelessly with the transceiver of a remote computer. The transceivers allow the wireless device to access the remote host computer through an infrastructure or ad-hoc network. The system also allows a user to view available remote host computers through the GUI of the wireless device and to access the programs and files of the remote computer. The remote computer in turn, transmits display commands to the wireless device. A similar system utilizes Bluetooth communications to enable a PDA to recognize and identify all compliant remote devices by transmitting a broadcast message that is received by compliant remote devices. In this system, the PDA includes a GUI to display a rendering of a mechanism that can be utilized to control a remote device. For example, the rendering might be of an on/off switch. The PDA receives input from a stylus, and translates this input into a command for the remote device.

Finally, a system is in known in the art for wirelessly communicating keyboard, video, and mouse data from a plurality of servers in one or more server racks to a plurality of user workstations through a KVM switch. The system discloses utilizing a combination of hardwired and wireless connections in order to reduce the cabling requirements in comparison to utilizing only hardwired connections. The system further discloses utilizing a video compression algorithm for transmitting video to the workstations. However, the system suffers from, inter alia, mouse cursor latency, a common problem in KVMoIP systems.

Current wireless remote management systems suffer from several limitations. Most significantly, as a result of limited bandwidth, standard wireless systems cannot offer the same performance as wired KVM systems. Specifically, the limited bandwidth results in troublesome keyboard, mouse and video signal latency between the remote device and user workstation. Therefore, there is a need to incorporate efficient compression algorithms in order to minimize latency. Utilizing Ultra Wide Band ("UWB") wireless technologies would, inter alia, further help solve the keyboard, mouse, and video signal latency experienced in current hardwired and wireless KVM systems. UWB is an emerging wireless communications technology that utilizes high bandwidth over short distances. UWB enables increased transmission speed over other wireless technologies. Currently, the technology transmits at speeds between 40-400 megabits/sec. In the future, it is expected that transmission speeds will reach 1 gigabit/sec. Under current transmission rates, UWB is generally limited to around 1-2 meters with high gain antennas. It is expected to be capable of transmitting signals over tens of feet operating at future peak transmission rates.

UWB transmits ultra-low power radio signals (i.e., very short electrical pulses with durations on the order of picoseconds ($1 \times 10E-12$ sec)) across all frequencies simultaneously. The simultaneous transmission over a large frequency range makes the data capacity enormous. UWB receivers must translate these short bursts of noise into data by listening for a familiar pulse sequence sent by a transmitter. Because UWB transceivers use low power short burst radio waves, they do not take as much planning to build, which results in UWB transceivers being easier and cheaper to build compared to typical spread spectrum transceivers. Additionally, as UWB operates at such low power, it has very little interference impact on other systems (i.e., UWB causes less interference than conventional radio-network solutions). Further, the relatively wide spectrum that UWB utilizes significantly also minimizes the impact of interference from other systems.

In February 2002, the FCC issued a First Report and Order giving users permission to deploy low powered UWB systems within the 3.1 to 10.6 GHz spectrum. These guidelines make UWB suitable for use in relatively short-range applications such as wireless personal area networks ("WPAN"). In December 2004, the FCC certified UWB positioning tags. Significantly, the IEEE Task Group 3a within the 802.15 Work Group is continuing its work on UWB technology and the limitations and barriers have fallen with the advent of wireless standards such as 802.15.3a. One disadvantage of utilizing UWB technology is its limited transmission range, which peaks at a range of five to ten meters. This limited range significantly hinders the use of UWB wireless technologies. However, the present invention solves this problem through utilization of an elaborate mesh topology.

Mesh topology, also called "mesh" or a "mesh network", is a network topology in which devices are connected with many redundant interconnections between network nodes. In a true mesh topology every node has a connection to every other node in the network. Two types of mesh topologies are commonly used: full mesh and partial mesh.

Full mesh topology occurs when every node has a circuit (or similar) connecting it to every other node in a network. Full mesh is very expensive to implement, but yields the greatest amount of redundancy. Thus, in the event that one of the nodes fails, network traffic can be directed to any of the other nodes. Therefore, full mesh is usually reserved for backbone networks.

Partial mesh topology is less expensive to implement and yields less redundancy than full mesh topology. With partial mesh, some nodes are organized in a full mesh scheme while others are only connected to one or two nodes in the network. Partial mesh topology is commonly found in peripheral networks connected to a full meshed backbone. Significantly, utilizing mesh topology enables signals to traverse greater distances.

In view of the foregoing, a need clearly exists for a wireless remote network management system utilizing UWB wireless technologies and mesh topology capable of non-intrusive wireless operation and control of networking equipment, servers, computers, and other remote devices. Furthermore, such a system should enable digital remote KVM access via networks such as WLANs, LANs, and the Internet. The system should allow a user to view all available remote devices via an on-screen user interface and to choose one of these devices to monitor and control. Finally, the system should capture, digitize, compress and transmit video with keyboard and mouse signals to and from a variety of remote devices.

SUMMARY OF THE INVENTION

It is often convenient to control one or more connected computers from one local set of peripheral devices (i.e., keyboard, video monitor, cursor control device, etc.). Since the majority of computers in use today incorporate or are designed to be compatible with commonly known and used computer technologies (e.g., IBM, Apple, Sun, etc.), many computers use identical or similar electrical connectors to connect a peripheral device. A computer typically contains a dedicated electrical connector for each type of peripheral device to which the computer will be connected. Generally, the cables that connect such peripheral devices to a computer are approximately six (6) feet in length, thereby limiting the distance from the computer at which the peripheral devices may be located.

In many circumstances, it is desirable to separate the peripheral devices from the computer due to space constraints. However, one skilled in the art may readily appreciate that separating a computer from its peripheral devices may make it difficult to locate the remote computers because they are commonly located in another area of the building, such as in a data center, server farm, etc. Unless; each device is clearly labeled, there exists no means of differentiating computers without their attached peripheral devices.

In addition to extending the distance between a computer and its peripheral devices, it is also convenient to access and operate more than one computer from one set of peripheral devices. Again, this feature is desirable when space is limited. In many situations it is difficult to run wires from the location of a server to its set of peripherals. Further, the utilization of longer wires necessarily leads to the degradation of the signals transmitted. For example, the high frequency components of such transmitted signals are often severely attenuated. It may also be desirable to access a computer through wireless communications.

The present invention provides a wireless remote device management system utilizing UWB technologies with a mesh topology scheme for administrating remote computers and devices from one or more local wireless-enabled user workstations. The user workstations may comprise a mixture of wireless enabled and hardwired stations wired to a LAN. The present invention may be used within data centers comprising a series of servers, which may be rack mounted. Further, the present invention preferably includes "n" UWB wireless-enabled computer interface modules ("WCIM") connected to "n" remote devices, where "n" corresponds to the number of remote devices. Alternatively, each WCIM may communicate with a plurality of remote devices. Each WCIM connected to a remote device bi-directionally communicates with other WCIMs and access point(s) via a mesh topology.

The data center UWB network is preferably controlled by a Network Management Server ("NMS"), which has its own assigned IP address and is connected to a LAN. The NMS is preferably embedded with proprietary software to determine the Quality of Service ("QoS"), security policies, routing algorithms, network filtering, and monitoring. Importantly, controlling the QoS enables the system to minimize end-to-end latency and specify a guaranteed throughput level.

The WCIMs communicate with one or more access points, which preferably share the same configuration and operate via the same IP subnet. The size of the data center determines the number of access points necessary. The WCIMs connect to the strongest access point signal, which is usually from the access point in closest proximity with the respective WCIM. The access points may be cascaded in order to increase the range of communications and communicate with each other and one or more of the access points communicate with a hub, which is preferably integrated into the NMS. Preferably, the integrated hub is a network power over Ethernet ("POE") hub. Alternatively, the hub may be stand-alone and connect to the NMS. In the preferred embodiment, the NMS (which contains the hub) connects via a network (i.e., LAN, WLAN, etc.) to one or more user workstations. Advantageously, use of an access point enables connection to the Internet. Thus, a user workstation with Internet connectivity may connect to the access point remotely and in turn, control a remote device. In this embodiment there is no restriction on the location of the user workstation. Further, the user workstation is not required to have wireless capabilities.

The WCIM creates and sends data packets, routed utilizing a routing algorithm with defined parameters, to the appropriate access point (i.e., to the access point that, among other things, shares the strongest connection with the WCIM). The WCIM preferably utilizes the attached remote device as a power source. It may be external or internal to the remote device. An external WCIM preferably includes at least one Universal Serial Bus ("USB") connection for, inter alia, powering the WCIM. Alternatively, the WCIMs may be powered by a power pack included within the WCIM. The WCIM may also have serial ports for connection to the networking equipment, as well as keyboard, video, and cursor control device ports for connection to the servers and computers. In addition, the WCIMs may have parallel ports, etc., and a port for connection to a power supply capable of controlling the power to the networking equipment, server, or computer. In the internal design, the WCIM preferably is attached on a PCI slot of a remote server or other device. Further, the WCIM includes plug-n-play capabilities, auto sensing over video settings and network connection, and an address resolution protocol ("ARP") function.

The present invention preferably uses software-defined radio ("SDR") for multiple server access and intelligent routing. SDR is a radio communication system that uses software for the modulation and demodulation of radio signals. An SDR performs significant amounts of signal processing in a general purpose computer or a reconfigurable piece of digital electronics. The goal of this design is to produce a radio that can receive and transmit a new form of radio protocol just by running new software. Software-defined radios have significant utility for the military and cell phone services, both of which must serve a wide variety of changing radio protocols in real time. The hardware of a SDR typically consists of a super heterodyne RF front end, which converts RF signals from and to analog IF signals, and analog to digital converters, which are used to convert a digitized RF signals to and from analog form.

An important feature of the present invention is the ability to display a list of available remote computers (or other devices) to a user on the user's local monitor. This list can be updated or refreshed automatically as remote computers enter or leave the network. It can also be updated as computers become available for control (i.e., a different user relinquishes control). A variety of methods may be utilized to generate and display the option menu. Preferably, the user workstation includes a general purpose processor that generates an option menu. Alternatively, an on-screen display ("OSD") processor may be utilized. In one embodiment the user workstation can be implemented as a purely software solution. In this embodiment, the option menu may be implemented as part of the user workstation software, and it can take advantage of existing APIs to display the option menu in a user-friendly fashion.

The present invention enables portable administration. That is, the present invention enables a user with a laptop, PDA, or other portable device, to walk around a data center consisting of target devices. A list of all servers and other remote devices in the range of the user's transceiver appear on the user's screen. The list may be automatically updated as remote computers enter or exit the wireless network. The present invention allows a user to view a list of available remote computers and to select a remote computer from this list for control. A user can access the system via a single IP address and select a target device and communicate with it while the entire network is still monitoring the rest of the targets. Additionally, the present invention enables control and management of remote devices from various user workstations via a network such as a LAN, WLAN, etc.

When the user workstation requests a connection to the WCIM, the connection request is sent over the network to the NMS. Utilizing the system's mesh topology, the request is sent to the appropriate WCIM via one or more access points and/or one or more WCIMs. Upon completion of the connection, the WCIM receives video signals from the remote computer, compresses the video signals, and utilizing the system's mesh topology, transmits the compressed video information to the user workstation via the access points, NMS, etc. In turn, the user workstation transmits keyboard and cursor control device data to the WCIM. The WCIM utilizes this data to provide emulated keyboard and cursor control device data to the keyboard and cursor control device ports of the remote computer. The user workstation decompresses the video information and provides video signals to the local monitor. In this manner, a user of the workstation can control the remote computer by utilizing the local keyboard and cursor control device, while viewing video signals from the remote computer on the local monitor.

The user workstation can communicate through a wireless KVM switch. Importantly, the wireless KVM switch can be a hybrid switch thus supporting both wired and wireless connections. In this configuration, a user workstation can communicate with a WCIM, even if the user workstation does not have wireless capabilities. That is, this configuration enables users at workstations to be hardwired to the hybrid switch and thus access and control remote devices connected to a WCIM.

Therefore, it is an object of the present invention to provide an improved wireless device management system that utilizes a mesh topology scheme and enables a user to control a plurality of remote computers or devices from local user workstations.

It is also an object of the present invention to provide digital remote KVM access via IP networks such as a LAN, WLAN, or the Internet.

It is another object of the present invention to provide non-intrusive remote access and control of remote devices.

It is still another object of the present invention to require no additional software to run on the remote device in order to eliminate any potential interference with the remote device's operation or network performance.

It is yet another object of the present invention to provide a secure, wireless computer management system that allows a local user workstation to wirelessly control a remote device utilizing a local keyboard and cursor control device, and to wirelessly receive video signals from the remote device.

Additionally, it is an object of the present invention to provide a wireless KVM network that enables a user workstation to provide a list of available remote computers and devices wherein the list is automatically updated as remote computers and devices become available.

Further, it is an object of the present invention to provide a modular, wireless, computer management system that allows one or more sets of peripheral devices to access and operate one or more remote computers as if the local peripheral devices were directly connected to the remote computers.

Furthermore, it is an object of the present invention to allow information technology ("IT") personnel to easily manage a volume of servers for both small-scale computer centers and large-scale computer centers such as data-centers, server farms, web-hosting facilities, and call-centers.

It is another object of the present invention to enable users to access a plurality of remote devices via a single IP address.

It is yet another object of the present invention to enable the WCIMs to automatically sense the video settings and network connection of the remote device.

It is still another object of the present invention to provide an ARP function for each WCIM.

It is still yet another object of the present invention to utilize the remote device as a power source for the WCIMs.

Finally, it is an object of the present invention to provide a wireless modular computer management system that eliminates the need for a set of peripheral devices for each remote computer thereby minimizing the space required to house the remote computers.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
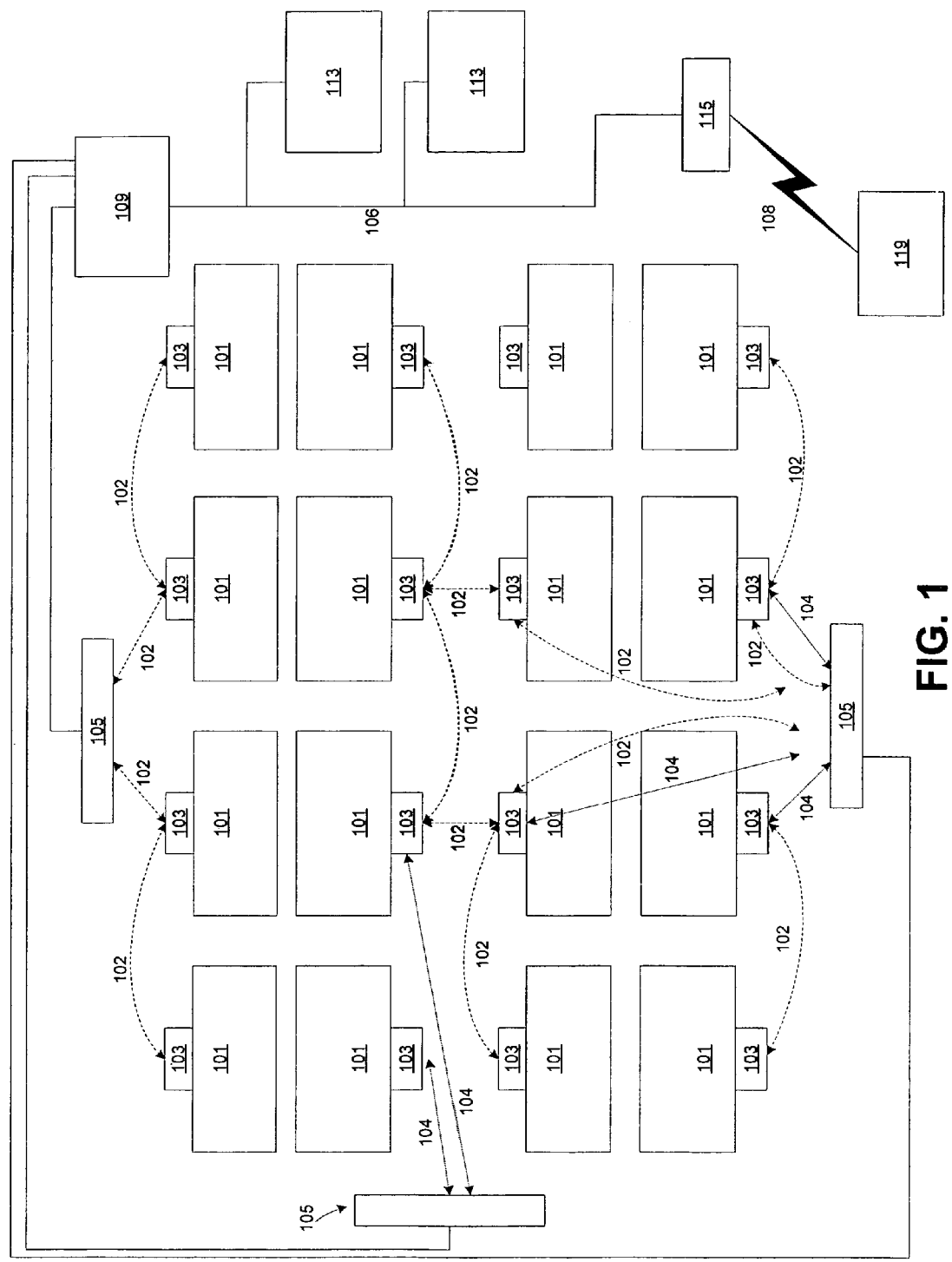
FIG. 1 is a schematic representation of the UWB data center KVM network according to the preferred embodiment of the present invention illustrating the bi-directional communication between users at user workstations and a plurality of remote devices, where each remote device is directly connected to a wireless-enabled computer interface module ("WCIM") through a Network Management Server ("NMS") and UWB access points.

Referring first to FIG. 1, depicted is a schematic representation of the UWB data center KVM network according to the preferred embodiment of the present invention illustrating the bi-directional communication between users at user workstations and a plurality of remote devices. While it is preferred that UWB communication standards are used, it is foreseeable that other short-range, high-throughput standards may alternatively be utilized. Each remote device 101 is directly connected to a wireless-enabled computer interface module ("WCIM") 103. WCIMs 103 are preferably powered via the connected remote device 101. WCIMs 103 communicate with each other and UWB access points 105 utilizing a mesh topology. WCIMs 103 preferably utilize a partial mesh topology, although it is foreseeable that other topologies such as full mesh may be utilized. For simplicity of the drawing, FIG. 1 only depicts part of the hopping technique preferably used by the present invention.

Wireless paths 102 illustrate multiple hops from a WCIM 103 to an access point 105. Wireless paths 104 show a direct path to UWB access point 105. WCIMs 103 communicate with UWB access point 105 via direct wireless path 104 based on signal strength and latency between WCIM 103 and UWB access point 105. While only three (3) UWB access points 105 are shown, one of skill in the art may readily appreciate that any number of UWB access points 105 may be incorporated into the system depending on the size of data center and the number of remote devices 101 installed.

UWB access points 105 preferably utilize 802.15.3a/f protocols or similar protocols, which eliminate the necessity for dedicated power runs to each access point. UWB access points 105 route user data, maintain network integrity by polling WCIMs 103 and provide load balance and QoS. UWB access points 105 bi-directionally communicate with NMS 109. NMS 109 includes embedded proprietary software for, inter alia, determining QoS, providing security (i.e., encryption, user name and PIN identification, RFID authentication, biometric authentication, etc.), routing algorithms, network filtering and monitoring. Importantly, determining QoS enables the present invention to minimize end-to-end latency and specify a guaranteed throughput. NMS 109 has its own IP address and preferably includes a network POE and a database of UWB access points 105 and WCIMs 103. Alternatively, the network POE may be stand-alone and connect to NMS 109 via standard cabling.

Preferably, NMS 109 connects to one or more user workstations 113 preferably via network 106, which may be a LAN, WLAN, etc. Network 106 may also connect to access point 115, which wirelessly communicates with user station 119 via wireless connection 108. Preferably, access point 119 and user station 119 communicate via 802.11 protocol, although one of skill in the art will readily recognize that other protocols may be utilized without departing from the spirit of the present invention. Advantageously, 802.11 protocol extends the distance over which user station 119 can communicate with remote devices 101. User stations 113 and 119 may be a desktop computer with attached peripherals (including a keyboard, cursor control device, and video monitor), laptop computer, tablet PC, PDA, etc. Additionally, user stations 113 and 119 may include a user interface module, which connects to user station and communicates with NMS 109. Advantageously, such a design, inter alia, eliminates any need to install additional software on the user station itself and helps further minimize latency.

A user at user station 113 transmits keyboard and cursor control device signals, preferably as TCP/IP data packets via network 106 to NMS 109, which sends converts the data packets into a format suitable for transmission to UWB access point 105. UWB access point 105 further converts the data packets as necessary. The converted data packets are then routed to the selected WCIM 103 on a hopping technique. It is preferred that such a hopping technique incorporates an intelligent routing algorithm, such as Software Defined Radio ("SDR") based on a series of parameters, including but not limited to, routing tables, signal strength, location and latency. Importantly, utilization of SDR enables simultaneously multiple access to several remote devices 101.

While user station 113 is transmitting data to NMS 109 and subsequently to the selected WCIM 103, the selected WCIM 103, utilizing a mesh topology, transmits compressed video data signals, preferably as UWB data packets, over wireless communications paths 102 and/or 104 to the appropriate UWB access point 105, which converts the received packets as necessary. If multiple UWB access points 105 are cascaded together, the data packets are transmitted along the UWB access points 105 until the packets reach the UWB access point 105 connected to NMS 109. If there are no cascaded UWB access points 105, the packets are transmitted directly to NMS 109. Once the packets reach NMS 109, they are converted and sent to the appropriate user workstation 113. Thus, the system of the present invention enables a user at user workstation 113 to view and control any one of a plurality of remote devices 101. One of skill in the art will recognize that a similar communication process occurs for users at user station 119.

One of the primary purposes of the present invention is to enable a user at a user workstation 113 to select and subsequently control a remote device 101. This selection may be accomplished through a variety of methods. In one embodiment, a menu or list of available remote devices 101 is displayed on the screen of video monitor attached to user station 113, which can utilize information provided by the network to update the option menu displayed to the user with a list of available remote devices. The option menu may also give the user the ability to manually adjust video settings to improve the quality of the transmitted video.

User station 113 interfaces with a keyboard, video monitor, cursor control device, and/or other peripheral devices such as USB peripherals, serial devices, etc. in order to control any of a plurality of remote devices 101. The keyboard and cursor control device may be connected utilizing PS/2 connectors, serial connectors, USB connectors, etc. Monitors are typically connected to a computer through a DB15 port. In one embodiment, during operation, a general purpose processor preferably within user station 113 receives the keyboard and cursor control device signals. The processor interprets these signals and generates data packets that include data representative of the keyboard and cursor control device information from the received keyboard and cursor control device signals. The data packets are combined with other information (such as destination information) and are included in TCP/IP communications sent via network 106 to NMS 109.

Keyboard and cursor control device signals may be transmitted bi-directionally in the system of the present invention. That is, these signals can also be transmitted from remote device 101 to user workstation 113. In this direction of transmission, keyboard and cursor control device signals are received as part of the data transmitted to the appropriate UWB access point 105 via paths 102 and/or 104. The UWB access points 105 communicate with each other and NMS 109 to send the data to user workstation 113. The processor uses this information to emulate or interpret the keyboard and cursor control device signals from remote device 101. These signals can be utilized to, inter alia, determine if the remote computer is responsive to the user's cursor control device and keyboard.

Unidirectional digital compressed video signals are received at user workstations 113 as part of TCP/IP data. As discussed in FIG. 2 below, WCIM 103 includes hardware and software to digitize and compress video received from remote device 101. This compressed data is received by UWB access point 105 via paths 102 and/or 104. UWB access point 105 converts this data as necessary and sends it to NMS 109, which subsequently converts and sends the data to user workstation 113. The user workstation's processor receives the compressed video data, decompresses and converts this data to an analog format compatible with a video monitor (or equivalent) located at user workstation 113. The system of the present invention may utilize the compression, digitization, and decompression method described in application Ser. No. 10/233,299, incorporated in its entirety herein by reference.

The user selects a remote device 101 for control by choosing from the computers on the menu. Preferably, the user station's processor utilizes existing application program interfaces ("APIs") to present a user friendly (e.g., with extensive graphics) interface to the user. An advantage of a software based implementation is that standard software APIs can be utilized to generate the option menu. Further, the menu can have a look and feel that is more familiar to the user (e.g., if Microsoft development software or Java APIs are utilized, the menu will resemble other Windows or Java applications). Utilizing commonly available APIs, the option menu may include graphics, icons, pull-down menus, etc. to present a more user-friendly interface.

Alternatively, the option menu can be generated by circuitry within user workstation 113. For example, the user workstation (or a device attached to the user workstation) may include an on-screen display (OSD) processor. The OSD can be instructed by a microprocessor to display a list of available remote devices 101. However, because most commercially available OSDs are character based, providing only a rudimentary interface to the user, a general purpose processor is preferred.

To switch to another connected device, the user preferably depresses a "hotkey", which results in the display of the option menu on the video monitor thus allowing a user to select a new remote device 101. The option menu produced on the video screen may refresh automatically as remote devices 101 enter and exit the network. Alternatively, the option menu may refresh every time a user wishes to be interfaced with a different remote device 101.

Figure 2:
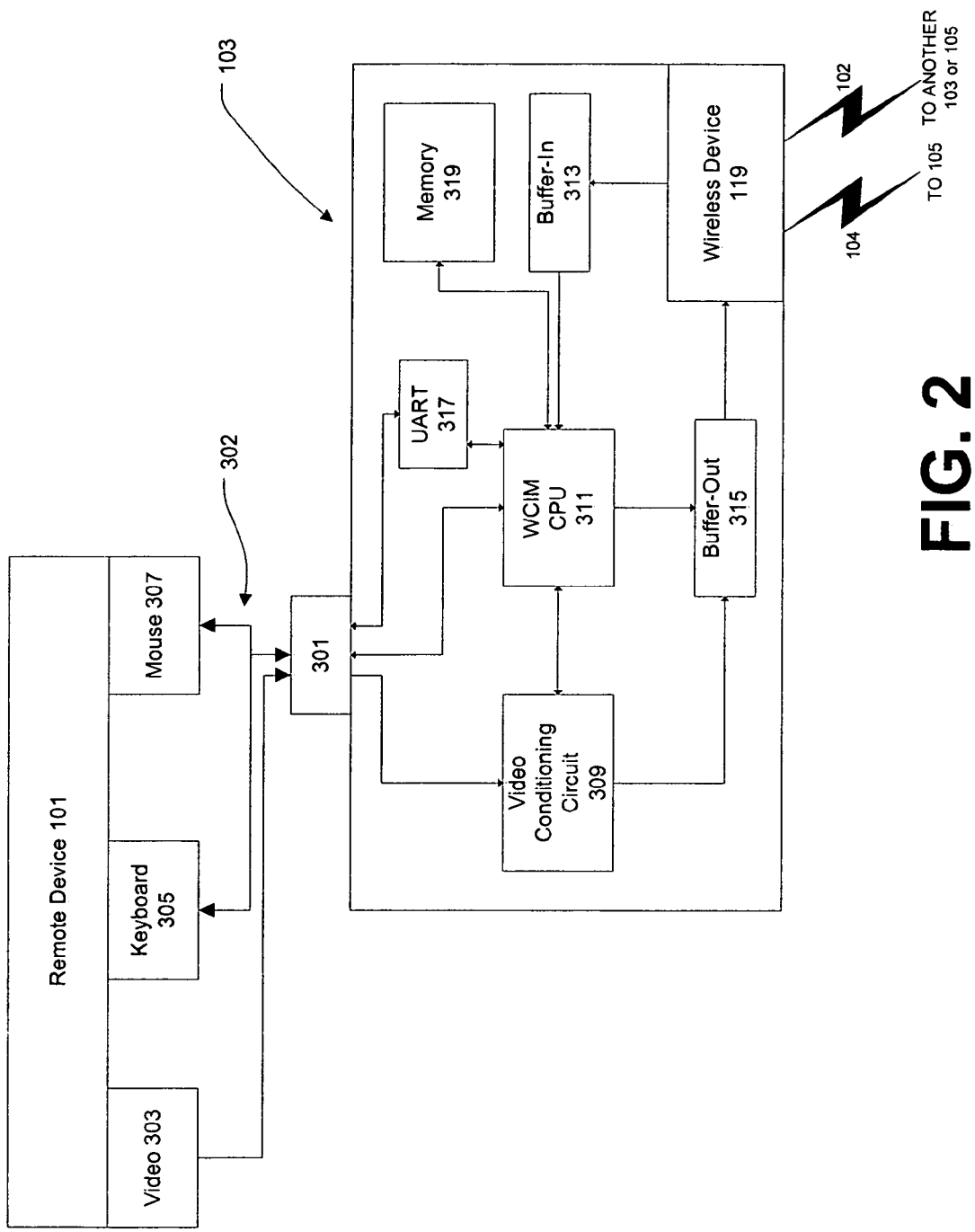
FIG. 2 is a schematic representation of the WCIM shown in FIG. 1 according to the preferred embodiment of the present invention illustrating a block diagram of the internal structure of the WCIM and connectors for a keyboard port, a video monitor port, and a cursor control device port.

Referring next to FIG. 2, depicted is the preferred embodiment of WCIM 103 according to the present invention. WCIM 103 includes KVM port 301 to communicate with video port 303, keyboard port 305, and cursor control device port 307 of remote device 101. During normal operation, WCIM 103 receives video signals unidirectionally from remote devices 101 through cable 302. WCIM 103 also transmits keyboard and cursor control device signals to keyboard port 305 and cursor control port 307 through cable 302. Alternatively, each of video port 303, keyboard port 305 and cursor control device port 307 may be connected to WCIM 103 utilizing separate cables for each port. Additional connections, e.g., serial, USB, parallel port, etc. may also be utilized. In another alternative embodiment, WCIM 103 is connected internally within remote device 101 via a PCI slot or similar. In this design, no additional cables are necessary.

Keyboard and cursor control device signals are wirelessly transmitted bi-directionally between remote device 101 and user station 113. Video signals are unidirectionally transmitted from remote device 101 to user station 113. To accomplish the transmission of video, keyboard, and cursor control device data, WCIM 103 preferably includes video conditioning circuit 309, WCIM CPU 311, buffer-in 313, buffer-out 315, UART 317, memory 319, and wireless device 119. Wireless device 119 enables WCIM 103 to communicate over wireless communications paths 102 and/or 104. One of skill in the art may readily appreciate that the wireless path 104 will transmit signals to other WCIMs 103 or an access point 105 based on the mesh topology and hopping technique and that wireless path 104 will transmit signals to access point 105 in closest proximity.

During operation, video signals are transmitted from video port 303 of remote device 101 to KVM port 301 of WCIM 103 via cable 302. From KVM port 301, the unidirectional video signals are transmitted to video conditioning circuitry 309, which converts the analog video to compressed digital video data. Video conditioning circuit 309 preferably utilizes the compression method and hardware described in co-pending application Ser. No. 10/233,299. This method utilizes a compression algorithm that takes advantage of the spatial and temporal redundancies typical of the video output of a remote computer. The method also utilizes algorithms that encode the red, green and blue components of the video signal for transmission over a digital connection. The digitized and compressed video, which may be temporarily stored in buffer-out 315, is transmitted by wireless device 119 to the appropriate UWB access point 105 or another WCIM 105 over wireless communications paths 102 and/or 104 utilizing the aforementioned mesh topology and hopping technique. Each WCIM 103 may receive and transmit data from other WCIMs 103 in order enable the data to be transmitted over the network. UWB access point 105 converts that data as necessary and routes it to NMS 109, which converts and transmits the data to user station 113.

Keyboard and cursor control device signals received from keyboard port 305 and cursor control device port 307, respectively, are transmitted via cable 302 to KVM port 301, whereupon the signals are sent to transceiver CPU 311. Transceiver CPU 311 creates data packets based upon information received from keyboard port 305 and cursor control device port 307. These data packets, which may be temporarily stored in buffer-out 315, are transmitted to UWB access point 105 by wireless device 119 utilizing UWB data protocol sent over wireless communications paths 102 and/or 104. Before reaching the desired UWB access point 105, the data may be routed through one or more WCIMs 103, depending on the system design. Similar to the video data, the keyboard and cursor control device data is transmitted to NMS 109, which converts and transmits the data to user station 113 via network 106.

Conversely, wireless device 119 receives data packets sent over the system from user station 113 through wireless communications paths 102 and/or 104. The data packets contain data related to a user's utilization of keyboard and cursor control device (or equivalents) associated with user station 113. These data packets may be temporarily stored in buffer-in 313, and are ultimately sent to transceiver CPU 311. Transceiver CPU 311 interprets the data packets received from user station 113 and generates emulated keyboard and cursor control device signals. These emulated signals are sent to KVM port 301 through UART 317. Specifically, UART 317 converts data from transceiver CPU 311 into a serial protocol understood by keyboard port 305 and cursor control device 307.

WCIM 103 also contains memory unit 319, which stores identification information for WCIM 103 and its connected remote device 101 including the assigned name, group, address, etc. This identification information is sent over the system by wireless device 119 to user station 113 for purposes of providing the user a list of available remote devices 101. Further, the identification information can be utilized in the routing of wireless data to the correct WCIM 103. In the preferred embodiment, remote device 101 provides power to WCIM 103. Thus, the equipment and cabling required for a dedicated WCIM power source is eliminated saving space and money.

Preferably, WCIM 103 is compatible with all commonly used computer operating systems and protocols, including but not limited to those manufactured by Microsoft (Windows), Apple (Macintosh), Sun (Solaris), DEC, Compaq (Alpha), IBM (RS/6000), HP (HP9000) and SGI (IRIX). Additionally, local devices may communicate with remote computers via a variety of protocols including Universal Serial Bus ("USB"), American Standard Code for Information Interchange ("ASCII") and Recommend Standard-232 ("RS-232"). WCIM 103 is compatible with, and preferably implements, encrypted or secure wireless transmission. Various standards for secure wireless transmission of data are known in the art. WCIMs 103 provide, inter alia, plug-n-play capabilities, auto sensing of video and network sensing and ARP functionality.

Figure 3:
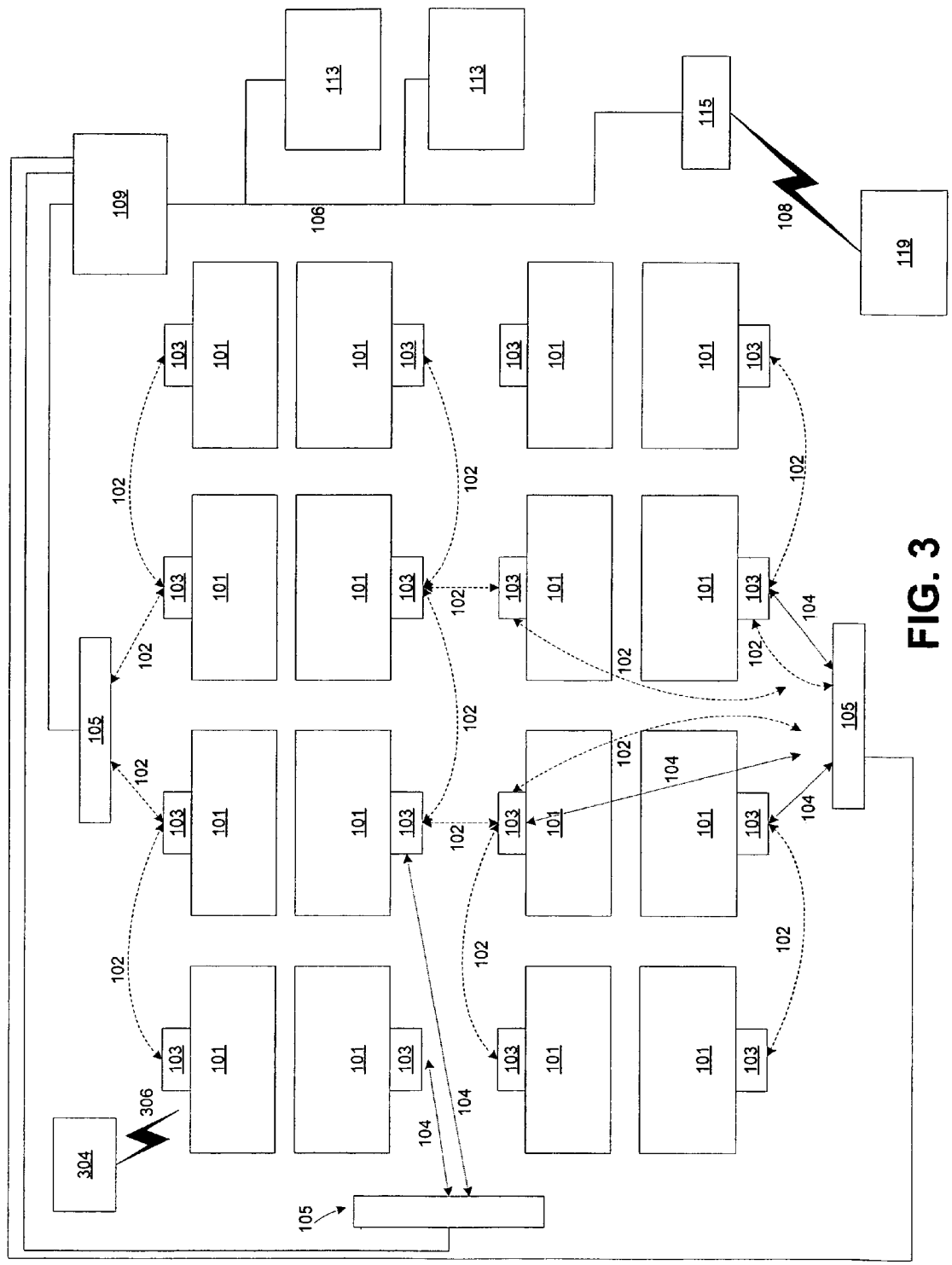
FIG. 3 is a schematic representation of the portable administration feature of the remote device management system according to the present invention.

Turning to FIG. 3, depicted is the portable administration feature of the present invention whereby a user with portable user station 304 (i.e., a laptop, PDA etc.) moves throughout the data center. User station 304 preferably operates via UWB protocol (i.e., 802.15.3a/f or equivalent) and includes a UWB transceiver for bi-directional communication with remote devices 101. Advantageously, UWB protocol enables short range, high throughput transmissions. As the user moves around the data center, all of the remote devices 101 within range of the user station's transceiver appear on the user station's screen. The user may select and communicate with a specific remote device 101 via wireless communication paths 306, 102, and/or 104. Simultaneously, the rest of the remote devices 101 may be monitored by user workstations 113 and/or 119, as discussed above in reference to FIG. 1.

Figure 4:
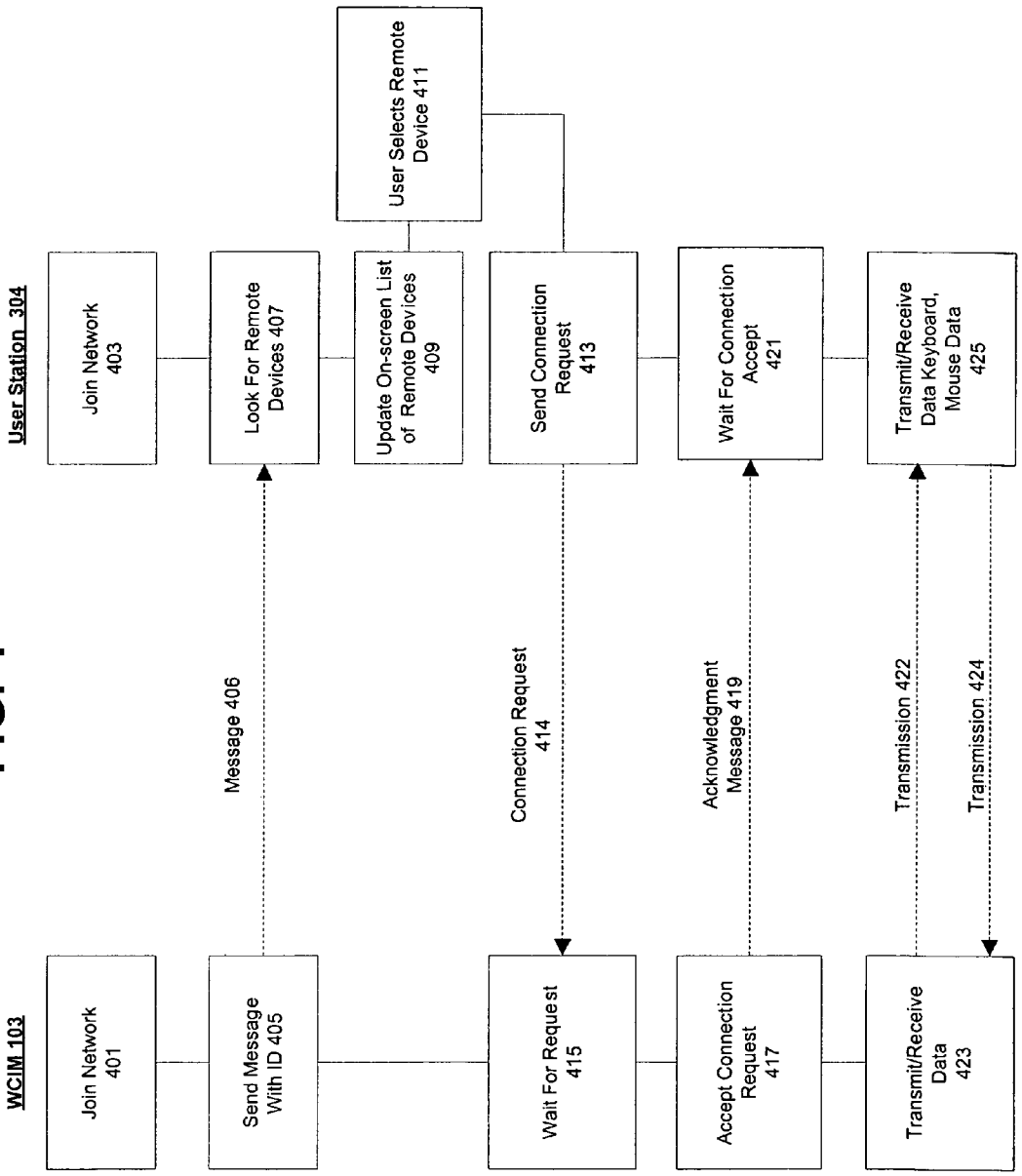
FIG. 4 is a flow chart that details the exchange of information between a WCIM and a portable user station to setup a connection between a user workstation and a remote device.

Referring next to FIG. 4, depicted is a flow chart that details the exchange of information between a WCIM 103 and portable user station 304 necessary to establish a connection between a remote device 101 and portable user station 304. The flow chart begins with WCIM 103 (coupled to remote device 101) and portable user station 304 entering the same network (steps 401 and 403). Entering the network may simply entail coming within a range of communications, being powered-on, etc. UWB technology provides for dynamic entry and exit of devices whereby wireless devices can automatically enter into the UWB wireless network.

WCIM 103 sends a message 406 that preferably includes identification information related to its associated remote device 101 (step 405). WCIM 103 may be configured to periodically send these messages to alert portable user station 304 entering the network of the availability of the associated remote device 101. Immediately after entering the network, portable user station 304 enters a state in which it listens for these messages (step 407). Upon receipt of a message, portable user station 304 updates the list of available devices displayed on the user station's video display (step 409). As the user with portable user station 304 moves around the data center, portable user station 304 continues to look for new remote devices 101 now within range of the user station's transceiver. Portable user station 304 sends messages that request responses from WCIMs 103. Upon receipt of the message, WCIM 103 responds with identification information about its associated remote device 101. Portable user station 304 updates the list of available remote devices 101 utilizing the identification information.

Portable user station 304 displays a list of available remote devices 101 to the user, which is updated upon detection of any WCIM 103 entering or leaving the network (step 409). If the user selects a remote device 101 from this list (step 411), portable user station 304 sends a connection request 414 (step 413). WCIM 103, which is in a waiting state (step 415), can deny the request or accept the request (step 417). For example, if the associated remote device 101 of WCIM 103 is under control of a different portable user station 304, WCIM 103 may deny the request. If WCIM 103 denies the request, a denial message is sent to portable user station 304.

If WCIM 103 accepts the request, WCIM 103 sends acknowledgment message 419 to portable user station 304. Once portable user station 304 sends connection request 414, it enters a waiting state (step 421) where it remains until it receives acknowledgment message 419. Upon acceptance of the connection, WCIM 115 sends acknowledgment message 419. Portable user station 304 then begins to transmit UWB data 424, which includes keyboard and cursor control device data (step 423), over wireless communications paths 306, 102 and/or 104 to WCIM 103. WCIM 103 receives the data and utilizes it to generate signals for the keyboard port 305 and cursor control device port 307 of the remote device 101.

Simultaneously, WCIM 103 begins to receive video data from its associated remote device 101. WCIM 103 receives the video data, digitizes and communicates it, preferably as UWB data 422, through wireless communications paths 306, 102, and/or 104 (step 421). This communication continues until the user of portable user station 304 selects a different remote device 101 to control.

To choose a different remote device 101, a user with portable user station 304 preferably depresses a designated "hot-key", which instructs portable user station 304 to display an option menu of available remote devices 101. The option menu includes a list of available remote devices 101, as determined by the receipt of the messages from associated WCIMs 103 (step 409). The option menu may be a GUI, which can include groups and descriptions of available servers, icons representing each server, etc. If the option menu is developed with software, it can have the look and feel of a standard environment (e.g., Windows, Macintosh, Java, etc).

Figure 5:
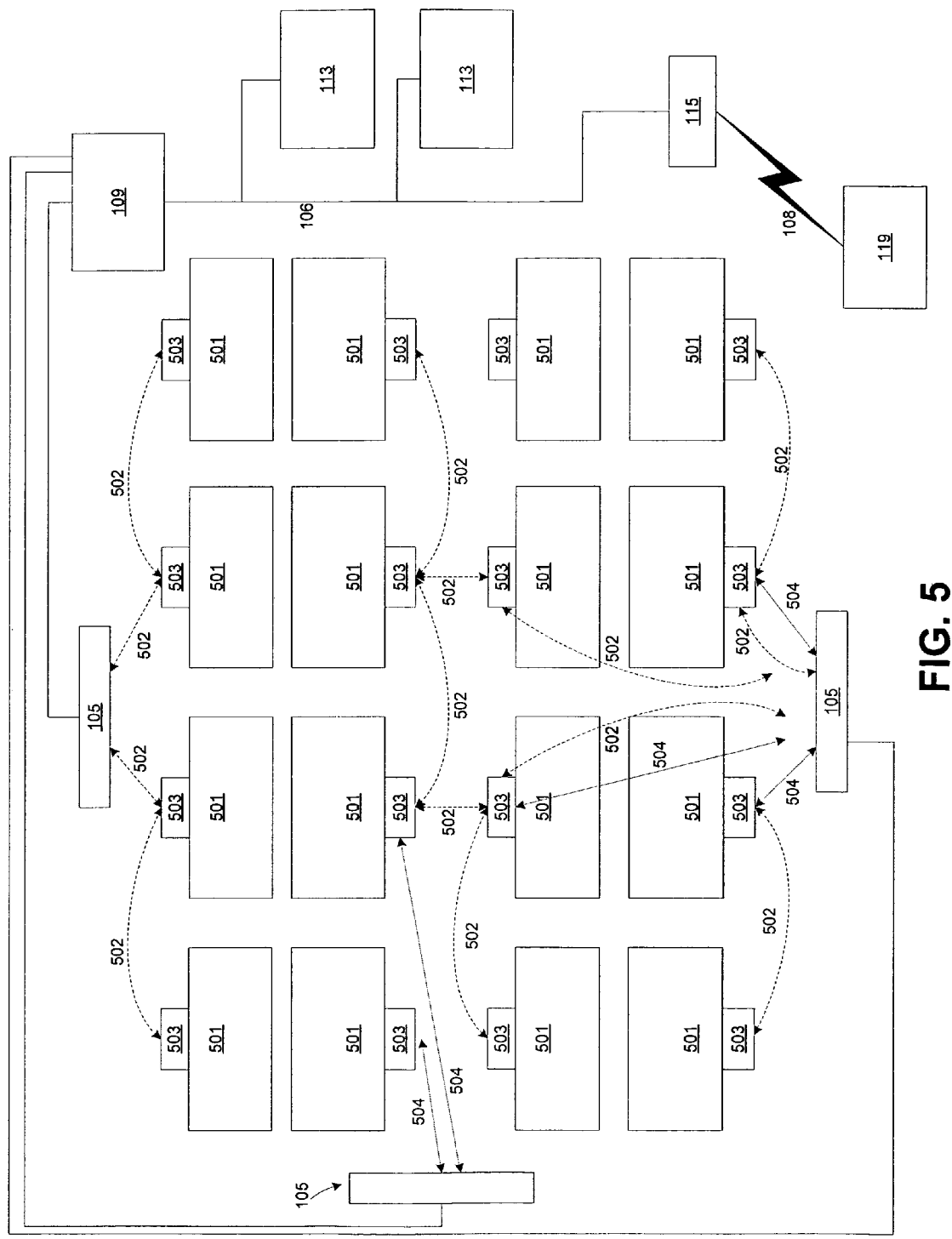
FIG. 5 is a schematic representation of the remote device management system according to an alternate embodiment of the present invention illustrating the connection of multiple remote devices to one composite WCIM.

Next, FIG. 5 depicts an alternative embodiment of the present invention in which multiple remote devices 101 (within server racks 501) interface with a composite WCIM 503. Composite WCIM 503 is similar to WCIM 103, but with increased capabilities (e.g., additional KVM ports and additional wireless devices). Similar to WCIMs 103 shown in FIG. 1, composite WCIMs 503 utilize a mesh topology to communicate with each other and/or UWB access points 105. Wireless paths 502 illustrate multiple hops from a composite WCIM 503 to an access point 105. Wireless paths 504 show a direct path to an access point 105. Advantageously, composite WCIM 503 enables the present invention to connect multiple remote devices 101 with minimal hardware. Utilization of composite WCIM 503 is ideal in server rack environments. In these racks, there is minimal space between servers often making it difficult and cumbersome to connect multiple devices to the servers within the server rack. Preferably, composite WCIM 503 is powered by a combination of one or more connected remote devices 101.

Figure 6:
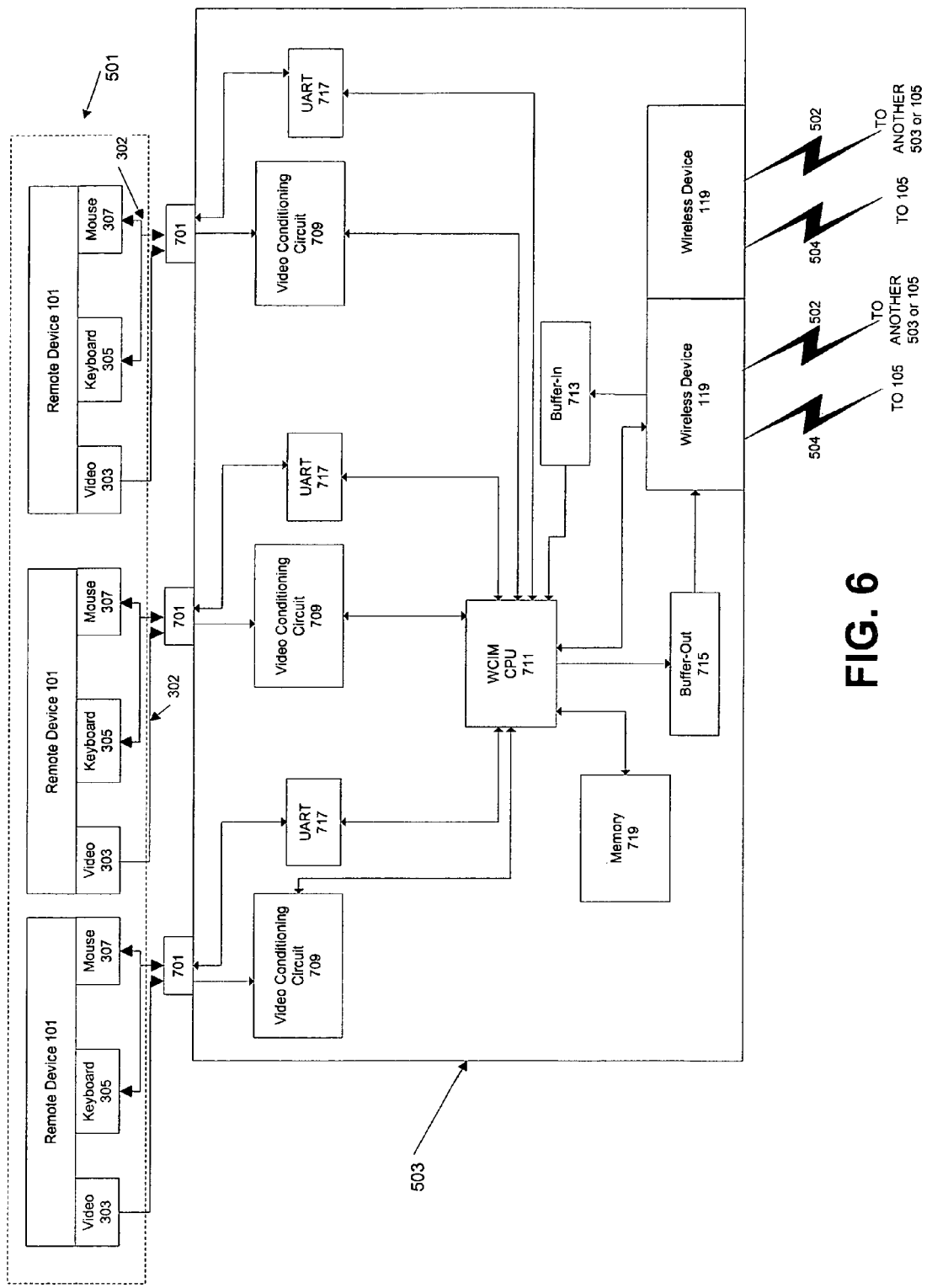
FIG. 6 is a schematic representation of the composite WCIM shown in FIG. 5 illustrating a block diagram of the internal structure of the composite WCIM and connectors for multiple keyboard ports, video monitor ports, and cursor control device ports.

Although the architecture of a composite WCIM 503 can vary, one example is shown in FIG. 6. Notably, composite WCIM 503 comprises similar components to WCIM 103 (FIG. 2), including transceiver CPU 711; buffer-in 713, buffer-out 715, and memory 719. To accommodate multiple remote devices 101 (three (3) are shown in FIG. 6, but more could be accommodated), composite WCIM 503 comprises multiple KVM ports 701, multiple UARTs 717 and multiple video conditioning circuits 709. Transceiver CPU 711 must have the capability to receive input from multiple sources and memory 719 must be capable of storing identification information for each attached remote device 101. Finally, composite WCIM 601 may have multiple wireless devices 119.

While the present invention has been described with reference to the preferred embodiments and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present inven-

What is claimed is:

1. A system for providing wireless monitoring and control of remote devices, said system comprising:
   at least one user station device coupled to a keyboard, a video monitor and a cursor control device, said user station device having circuitry for receiving signals from said keyboard and said cursor control device;
   a plurality of transceivers each comprising a wireless communications device;
   at least one access point for communicating with said plurality of transceivers; and
   a network management server in bi-directional communication with said at least one access point and said at least one user station, said network management server having embedded software for the determination and management of quality of service;
   wherein the embedded software control of the quality of service minimizes the end-to-end latency of signals and guarantees a throughput level in the system;
   wherein said user station bi-directionally communicates keyboard and cursor control device information with said remote device;
   wherein each of said transceivers is coupled to at least one of said remote devices for receiving and converting video data from said remote devices and for unidirectionally transmitting said video data over a wireless network to said at least one user station utilizing a mesh topology;
   wherein each of said transceivers contain a memory unit for storing identification information of the transceiver and identification information of the coupled remote device;
   wherein said transceiver is configured to transmit the identification information over the wireless network to the user station device; and
   wherein said wireless network is an ultra-wide band wireless standard network.

2. A system according to claim 1, wherein said remote device is a server.

3. A system according to claim 1, wherein said video data is compressed before being transmitted by said wireless communications device.

4. A system according to claim 1, wherein said video data, said keyboard data, and said cursor control device data are encrypted before being transmitted by said wireless communications devices over said wireless network.

5. A system according to claim 1, wherein said network management server comprises a network power over Ethernet hub.

6. A system according to claim 1, wherein said transceiver is powered by said remote device.

7. A system for monitoring and control of remote devices utilizing a mesh topology, said system comprising:
   at least one portable user station;
   a plurality of transceivers for physically interfacing with a plurality of remote devices, each said transceiver comprising a conversion circuit for receiving and converting video data from one of said remote devices and a memory unit for storing identification information related to the transceiver and the coupled remote device;
   a transmission circuit disposed between said transceiver and said portable user station for transmitting said video data over a wireless network from said transceiver to said portable user station utilizing a mesh topology; and
   a receiving circuit connected to said portable user station for receiving said transmitted video data over said wireless network;
   wherein the plurality of transceivers broadcast an identification message containing the identification information and the portable user station enters a inquiry state when the portable user station is within range of at least one of the plurality of transceivers;
   wherein said portable user station displays a list of said remote devices based on the identification information contained in the identification message;
   wherein said portable user station is configured to transmit a connection request for connecting to one of said remote devices on the list of devices to one of the transceivers that physically interfaces with the one remote device via a wireless communication path between said portable user station and the one transceiver, and the one transceiver is configured to broadcast a denial message when the one remote device is connected to another portable user station;
   wherein said list is automatically updated by said portable user station when each of said remote devices becomes within range of said portable user station;
   wherein said portable user station determines and manages the quality of service in order to minimize the end-to-end latency of signals and guarantee a throughput level in the system.

8. A system according to claim 7, wherein said user station transmits a connection request message to one of said plurality of transceivers in response to a user's selection from said list.

9. A system according to claim 7, wherein said list includes information related to said remote devices.

10. A system according to claim 7, wherein said video data is compressed before being transmitted over said wireless network.

11. A system according to claim 7, wherein said video data is encrypted before being transmitted by said transmission circuit over said wireless network.

12. A system according to claim 7, wherein said receiving circuit receives keyboard and cursor control device data from said user station.

13. A system according to claim 12, wherein said keyboard data and said cursor control device data are encrypted and transmitted to said remote device over said wireless network.

14. A system according to claim 7, wherein said wireless network is an ultra wide band wireless standard network.

15. A system according to claim 7, wherein said transceiver is powered by said remote device.

16. A method of wirelessly transmitting keyboard signals, cursor control device signals and compressed video signals between at least one portable user station and a select remote device utilizing a mesh topology, said method comprising the steps of:
   storing remote device identification information;
   broadcasting remote device identification information and a remote device available message;
   receiving the remote device identification information and the remote device available message on the portable user station;
   displaying a menu of available remote devices on a video display of the portable user station;
   updating said menu of available remote devices via a wireless network;
   receiving a user request to select one of said available remote devices;

transmitting a connection request message from said portable user station to said selected remote device over said wireless network via a wireless communication path between said portable user station and said selected remote device, in response to said user request;

determining whether the selected remote device is connected to another portable user station;

transmitting a denial message to said portable user station when said selected remote device is connected to the other portable user station; and transmitting an acknowledgement message to said portable user station when said selected remote device is not connected to the other portable user station.

17. A method according to claim 16, wherein said wireless network is an ultra-wide band wireless standard network.

18. A method according to claim 16, wherein said video data is compressed by a transceiver coupled to said remote device before said transmission to said portable user station occurs.

19. A method according to claim 16, wherein said video data, said keyboard data, and said cursor control device data are encrypted before between transmitted over said wireless network.

20. A method according to claim 16, wherein said selected remote device is not connected to the other portable user station, further comprising the steps of:

transmitting video signals from said selected remote device to said portable user station over said wireless network;

transmitting keyboard and cursor control device signals from a keyboard and cursor control device of said portable user station to said selected remote device over said wireless network;

determining the quality of service utilizing embedded software; and minimizing the latency of video signals and keyboard and cursor control device signals to guarantee a level of throughput.

* * * * *